(12) United States Patent
Dagaeff

(10) Patent No.: US 8,510,250 B2
(45) Date of Patent: Aug. 13, 2013

(54) SYSTEM AND METHOD FOR MULTI-SOURCE SEMANTIC CONTENT EXPLORATION ON A TV RECEIVER SET

(75) Inventor: Thierry Dagaeff, L'isle (CH)

(73) Assignee: Nagravision S.A., Cheseaux sur Lausanne (CH)

( * ) Notice: Subject to any disclaimer, the term of this patent is extended or adjusted under 35 U.S.C. 154(b) by 195 days.

(21) Appl. No.: 13/137,109

(22) Filed: Jul. 21, 2011

(65) Prior Publication Data

US 2012/0023055 A1    Jan. 26, 2012

Related U.S. Application Data

(60) Provisional application No. 61/366,536, filed on Jul. 22, 2010.

(30) Foreign Application Priority Data

Oct. 26, 2010    (EP) .................................... 10188908

(51) Int. Cl.
*G06F 17/00*    (2006.01)
*G06N 3/00*    (2006.01)

(52) U.S. Cl.
USPC .............. 706/47; 707/609; 707/705; 382/165

(58) Field of Classification Search
USPC ........................................................ 706/47
See application file for complete search history.

(56) References Cited

U.S. PATENT DOCUMENTS

| | | |
|---|---|---|
| 6,311,194 B1 | 10/2001 | Sheth et al. |
| 2008/0066100 A1 | 3/2008 | Brodersen et al. |
| 2010/0162343 A1 | 6/2010 | Roberts et al. |
| 2011/0289118 A1* | 11/2011 | Chen et al. ..................... 707/803 |
| 2011/0295823 A1* | 12/2011 | Sathish ......................... 707/705 |

FOREIGN PATENT DOCUMENTS

| | | |
|---|---|---|
| GB | 2469575 A | 10/2010 |
| WO | WO-0169428 A1 | 9/2001 |

OTHER PUBLICATIONS

European Search Report for European Patent Application No. 10188908.7.

* cited by examiner

*Primary Examiner* — Kakali Chaki
*Assistant Examiner* — Kalpana Bharadwaj
(74) *Attorney, Agent, or Firm* — Harness, Dickey & Pierce, P.L.C.

(57) ABSTRACT

The present invention refers to the field of metadata enhancement system for broadcast televisions program, in particular to provide to the customer more information about a current, past or future broadcast. It concerns a method to enhance transmitted contents, said method starting from the metadata to populate a knowledge database. This method is based on a iterative process to fetch information from open Internet using as search criteria the result of the previous search. The data in the knowledge database are organized in data triple. According to one embodiment, the iterative process is stops when the returned data are related to another content.
The knowledge database is then accessible for a user to obtain additional information about a content by sending a suitable request to the Query Server Module in charge of the knowledge database.

13 Claims, 6 Drawing Sheets

SYSTEM AND METHOD FOR MULTI-SOURCE SEMANTIC CONTENT EXPLORATION ON A TV RECEIVER SET

This application claims priority under 35 U.S.C. §119(e) to U.S. Provisional Application No. 61/366,536, filed on Jul. 22, 2010, and further claims priority under 35 U.S.C. §119 to European Patent Application No. 10188908.7, filed on Oct. 26, 2010 in the European Patent Office, the entire contents of each of which are hereby incorporated herein by reference.

INTRODUCTION

The present invention refers to the field of metadata enhancement system for broadcast televisions program, in particular to provide to the customer more information about a current, past or future broadcast.

The claimed system lets the TV content consumers access as many content metadata as possible, not limited to direct content information (such as movie genre, actors, director, producer and studios, TV-series episode, documentary topic, TV-show presenter, etc.) by encompassing cultural metadata (geography, history, characters, political topics, art works, professions, tools, science, etc.), merchandizing metadata (sponsored material like cars, watches or clothes, travels, merchandized items, DVD of the like, music CD, books, etc.), user generated metadata (comments, ratings, mashups, etc.), and product metadata (schedule, content stores, VOD catalog, pricing, etc.). Some metadata categories can be defined to help organizing the metadata presentation, but the type of data are not predefined. Rather, meta-types are defined. For instance, a piece of data can be 'about the movie' and will be stored as it. This allows gathering data of very different natures and let each movie be related to many kind of data belonging to any domain of the human knowledge.

The invention makes use of a new data structure managed at a server side (solving the bandwidth issue), a client application on the TV-receiver side designed to receive and display data with said structure (solving the rendering issue), a method to communicate user queries between the client and the server, and a method to manage these queries on the server side so to match the local ontology or re-direct part of the query to the interne (solving the data gathering issue).

CONTEXT

With the raising number of available digital audio/video contents (like movies, TV series, live events, documentaries) due to the increasing number of content sources (TV channels, VOD catalog, internet stores) and content purchase methods (pay-per-view, subscription, catch-up TV, pull and push VOD), and the emergence of new content types (like user generated content), the consumers need very efficient tools to help them finding content that will fit their preferences and expectations.

To satisfy these consumers' needs, the operators offering content through their managed network have not only to augment and improve the volume of their content offer consequently, but must also increase the volume of related content metadata accordingly: the metadata must be rich enough to represent all consumers' needs in terms of tastes and expectations that will translate in content search criteria. Indeed, in order to help the user finding content, metadata have to describe the various aspects of contents that the consumer is likely to use as search criteria. As a consequence, the management of content metadata by operators is becoming much more complex all along the value chain: from acquisition to rendering, through metadata storage, handling, examination, understanding, and delivery.

PRIOR ART

The operator prepares its catalog (i.e. VOD catalog and broadcast events) in advance at back-end. It has content assets (in VOD case) and schedules (in broadcast case). Content metadata are gathered also in advance (i.e. before putting the VOD content asset on-line or before the scheduled time of broadcast events). Some content metadata are provided with assets or with event schedules by content providers. Content metadata can also be acquired from $3^{rd}$ party metadata stores. Eventually, the Web may provide today a huge and accurate amount of content metadata. It must be noticed that expanding content metadata by fetching more metadata on the Web can also be used on top of metadata that are provided with content or by $3^{rd}$ party sources.

Once acquired, metadata are stored in a database and associated in some way to the assets and scheduled events. They are organized according to a few meaningful fields, like description, contributors, origin, etc. Standards like TV Anytime may be used for this. Most often, data will be acquired in the format used to deliver them.

Once conveniently prepared, metadata can be either delivered with the content (i.e. embedded in VOD or broadcast streaming) or kept at back-end. In the first case, application using the metadata can be entirely implemented on the receiver side. In the second case, the receiver access to metadata through a client-server architecture which requires the receiver to have a return-path, i.e. a connection to the back-end.

Once delivered, metadata can be presented in the whole to the consumer, or filtered out in order to present consumer-personalized content information, or they can be exploited by applications that are in charge of helping the consumer to find given content or content of interest.

The content search functionality can use metadata in two different ways, and the two ways are often combined. The first way consists in providing a search tool to the consumer to enter formatted search criteria, which are then matched with metadata. The second way consists in recommending contents on the basis of a match of the consumer's profile with content metadata.

The search criteria entered by a consumer must correspond to the metadata structure so to be answered. The consumer may enter a number of terms in a number of fixed fields corresponding to different data domains; e.g., the consumer searches movies with a given actor or director, with a given keyword in title, or belonging to a given series. Often, contents are categorized in genres (action, comedy, drama, etc.) and subgenres (war, detective, love, humor, etc.), this information being part of the metadata; in this case, predefined queries allow the user to find content of a given genre. If less specific and controlled metadata are provided, it is in the form of tags that can be used as keywords in the searches. Tags constitute a bunch or words that are attached to the content without particular structure (no other meaning and structure than being related to the content in some way).

Content recommendation consists in presenting to the consumer only a subset of the content offer, at least in a first view; this subset must correspond to estimated consumer preferences and tastes. Thus, this approach often relies on the availability of a description of the consumer's preferences and tastes, which constitute the consumer's profile (NB: It is also possible to provide filters on the basis of what other users that watched the same movie are liking—this is the basis of social recommendation; but this method is just he starting point in recommendation systems). Consumer's profiles are built from data-mining technologies. The recommendation engine in charge of evaluating consumer's preferred contents depends on one hand on the accuracy of the modeling of consumer habits and behaviors by the consumer's profile and on the other hand on the granularity of the content metadata. Recommendation results from the matching of the consumer's profile with the content metadata. Tags are also used in the recommendation approach in order to refine the matching operation by comparing content tags with tags extracted from the descriptions of the consumer preferences.

Thus, the consumer's profile must be based on the same terms than the content metadata. For instance, consumer preferences will be described as a subset of predefined movie genres. Or, in order to be able to use a consumer's preference for a given actor, there must be a data-mining process to detect the consumer's preference for this actor and inscribe it in the consumer's profile; on the other hand, the content metadata format must include the corresponding actor information in movies where said actor plays.

Consumer profiling can be combined with search tools in order to narrow the search space. It can also be combined with any other content metadata display tool in order to filter out metadata and present only consumer-personalized information.

PROBLEM TO BE SOLVED

In all cases, the amount of content metadata is limited. The limit depends on the methods and technologies used to gather the information and to store and deliver it. Metadata are limited by the following factors:

Bandwidth: The metadata must not be too bandwidth consuming when embedded in the content.
  Storage: Database capacity and related performance considerations.
  Model: No predefined data model can represent all the possible situations and terminology needed to describe a piece of content.
  Gathering: If the metadata are provided by $3^{rd}$ parties, the limit will be imposed by the $3^{rd}$ party's own limitations or contractual and pricing considerations. If the data are mined on the open internet, the limit imposed by the gathering method equals the limits imposed by the data model and database storage capacity, since the operator's metadata store cannot contain the information found on the whole Internet.
  Interface: When metadata are exploited by search tools, only metadata that can be actually searched are useful. Other metadata can be ignored. Now, the search possibilities are often limited by the TV set ability to allow entering complex queries. In particular, STB interfaces with classic remote control devices do not allow for easy typing of complex values in search fields. The most often, this is solved by proposing a limited choice of possible values, in a pop-up menu for instance.
  Exclusiveness: Obviously, the previous interface limitation can be resolved by using a second device rather than the traditional TV receiver, like an Internet tablet that is synchronized in some way with the TV program. However, it must be noticed that the final solution of an Internet tablet directly searching on the open Web is not considered here: we envisage only the case where the operator has as a main objective which is to provide information in relationship with its offer, in a world closed on the operator offer. This imposes to use the metadata management and storage as a buffer between the consumer searches and the open internet.
  Usage: For all approaches based on consumers' profiles (i.e. recommendation, narrowed search space, filtered information), content metadata that are not taken into account by the consumers' profiles are of lesser use. In order to help solving previous limitation issues, only the data that are relevant for consumer profile contextualization and for recommendation narrowing process are kept. There are systems that make use of rich information gathered on the Web, possibly using Semantic Web technologies and ontologies to describe and manage consumer and content data. These systems use the rich and structured information got by the semantic web technologies for the recommendation computation, performed at the server side, but not to provide a browsing/exploring experience to the consumer. The consumer cannot freely navigate among the available content data As a consequence, metadata not entering a predefined interface or not matching a predefined category, which is useful either for search criteria or for recommendation, are not used: Many data concerning multiple and rich aspects of the content are limited or not even taken into account. Thus, both search and recommendation techniques are likely to miss aspects of the content that would have driven the user interest. The approaches allow for no surprise: Unlike with Internet-based searches, there is no chance left to the consumer to follow its own inspiration in exploring information about content. Indeed, a typical human cognitive activity is to build associations. A content topic may be the source of an association leading the consumer to thinking to other topics and desiring to watch contents about this associated topic. Limited pre-computed metadata fail to represent such associations. Serendipity is banned.

As already mentioned, the bandwidth limitation issue can be solved using connected TV sets and the interface limitation issue can be solved using second screen devices. The exclusiveness issue is actually constraining the solutions to the gathering, storage and model issues: if one just provides a free Internet browsing experience, no data model or buffer are necessary.

Problem reformulation: Thus, the remaining issue can be stated as a model issue, with the constraint to take exclusiveness, gathering, storage, and usage into account, where the usage constraint consists now as allowing for human-like associations and serendipity.

BRIEF DESCRIPTION OF THE INVENTION

The starting point of the claimed method consists in structuring metadata into a meaningful structure of triples related to the content, instead of the mass of tags.

This is achieved thanks to a method to to enhance transmitted contents, the method comprising the steps of:
  selecting contents to be transmitted and obtaining metadata related to these contents,
  processing the metadata so as to produce enhanced metadata, said enhanced metadata being used to describe the contents, said enhanced metadata being obtained by the steps of:
    selecting a content to be processed, and, for said content,
    parsing the metadata of said content to populate a knowledge database so as to obtain transformed metadata in the form of data triples, each triple being formed by a subject, a predicate and an object, a first set of data triples being defined by a first value of the predicate, extracting from the metadata, data to populate a first level of the first set of data triples, the subject of said data triples being a reference to the content, iterating a data enrichment process n times, said data enrichment process creating at each iteration a new level of first set of data triples, by fetching from the open Internet additional data to be set as objects of elements of first set of data triples, each subject of said elements being an object of elements of the first set of data triples obtained at the previous level of iteration, if during the iteration, the fetched additional data is detected to be related to another content, representing this relationship as a new element of the first set of data triple in which the subject is said fetched additional data and the object is a reference to said detected related content, the number n of iterations is determined by two integer parameters N and K, N>0 and K≧N used as follows:

iterating the enrichment process from 1 to K, and in the case that one of the fetched additional data is detected to be related to another content, storing into the knowledge database all first set of data triples previously created up to the level in which this positive detection is found, and in the case that none of the fetched additional data is related to another content, storing into the knowledge database the first set of data triples corresponding to the iteration 1 to N, sending at least one of the contents on a specific channel with the reference to the content corresponding to the one stored in the knowledge database;

receiving the content by a receiver implementing a specific client module, receiving by a query server module connected to the knowledge database a request from said client module identifying said at least one specific content with the said reference;

sending by the query server module all or part of the enhanced metadata related to the identification of the specified content;

controlling by the client module a graphical user interface in charge of displaying the result sent by the server in order to translate the received data triples into graphical elements.

For the sake of understanding the below description, we have taken an example of a specific value (first value) of the predicate of a triple, named 'topic'. For a given 'topic', the data triples related to this topic are named a first set of data triples.

The meaning of the topics is two sided. Firstly, topics are classified according to domains that represent categories of the human knowledge. Such domains may apply to any topic, rather than fitting in the semantic of multi-media content types. The method of the invention computes domains and classifies topics automatically.

Secondly, we have defined a second set of data triples, which are related to the first set through a second value of the predicate of the triple, named 'semantic link'. The semantic link is the justification of the topic-content relationship, it tells for which reason and to which extend the topic is relevant to the content. For instance, if a topic such as 'middle-age' is related to a movie, it is recorded that the link comes from the fact that there are many middle-age artworks discussed and shown during the movie; whereas in another situation, the reason could simply be that the middle-age is the time of the movie plot. The method of the invention computes the semantic links automatically.

The semantic link is the signification of the topic regarding the particular piece of content while the domain is its generic meaning. As a result, the limited number of movie genres is replaced by the much more opened number of human knowledge domains combined with the unbounded sets of semantic links.

SUMMARY OF THE INVENTION

BRIEF DESCRIPTION OF THE FIGURES

The present invention will be better understood thanks to the figures in which:

the FIG. 1 illustrates the data structure i.e. the topics, semantic links and domains the FIG. 2 illustrates an example of the Simple field and textual derivation the FIG. 3 illustrates the by-content expansion process the FIG. 4 illustrates the by-topic expansion process the FIG. 5 illustrates the Iteration of the by-topic expansion process the FIG. 6 illustrates the complete system architecture the FIG. 7 illustrates the database structure of the invention the FIG. 8 illustrates the client apparatus the FIG. 9 illustrates one embodiment of the complete system

DETAILED DESCRIPTION

Figure 1:
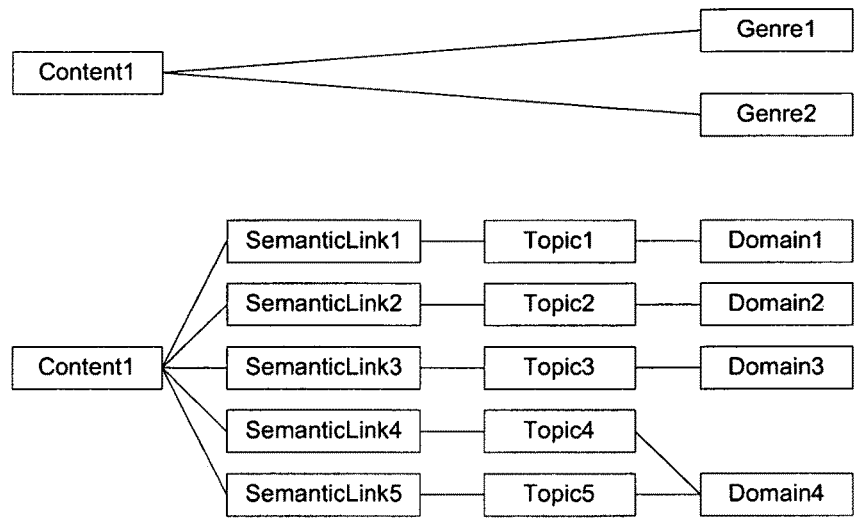

According to the invention, it is proposed a method to enhance transmitted contents by a management center to a plurality of receivers.

Previously to the broadcast of a content, the method aims at providing enhanced information about one content, information that can be requested by a user while the content is broadcasted.

The first phase is the preparation of a database, called knowledge database with information about contents. For that purpose, the Query Server Module (QSM) comprises processing means to process the incoming requests and to prepare the outgoing message, an interface to an knowledge database that contain the enhanced data relating to the contents. The QSM receives from the management center the list of the contents to be broadcast together with the metadata associated to each content. A content is identified by a content reference for organization purpose.

The knowledge database is organized in data triple. Each triple is formed by a subject, a predicate and an object. A set of data triple is a set sharing the same value for the predicate. For a given first value of the predicate, we can define a first set of data triple.

The collected metadata for a given content are processed and organized in data triple, these data triple being called first level of data triple.

The QSM then continue its processing to add further data triples corresponding to additional level of data triples. It is an iterative process and at each level, new data triples are created populated by data extracted form various external information sources such as open Internet. At each level, the search terms being the object of the previous level, the fetched information being the subject of the current level.

In each iteration process, the key is to stop this loop and find appropriate criteria to do it. In our case, a comparison is carried out to determine if the fetched information are related to another content. In the positive event, the iteration process is stopped.

Since it is not possible to determine in advance how deep into the different levels it would be necessary to go until a match between two contents is found, the number iterations is parameterized according to two parameters, i.e N and K.

The parameter K determines the minimum number of levels to keep into the knowledge database even if no match is found. The data triples created during the further levels are discarded.

The parameter N determines the maximum number of level before the enrichment process stops. In case that no match is found, the data triples corresponding to levels above the parameter K are discarded.

The second phase is the exploitation of the data contained in the knowledge database. The management center is in charge of broadcasting contents together with the metadata. The metadata comprises the reference to the content.

At the reception, the receiver can activate its client module to obtain enhanced information about the content. It is worth noting that it is not necessary to request enhanced data for a currently broadcast content, it is also possible to request enhanced data for a content that will be broadcast later, or that was previously broadcast. The EPG is a easy interface to select one content and request the enhanced data.

The client module, e.g. in the form of a enhanced remote control with a display, send a request to the QSM with the identification of a content.

The QSM then seeks in its database the data triples related to this content and send them to the client module of the requestor. This can be done through an Internet communication, or a specific channel within the broadcast feed.

The client module comprises an interpreter to process the data in the format of triple so as to translate the received data into suitable display information.

In the FIG. 1, the limited genre is replaced by an unbounded number of topics pertaining to a content (here there are 5 relevant topics); each topic is related to the content through a specific semantic link; each topic belongs to a knowledge domain. The number of domains covered by a content through all pertaining topics may be much higher than the content genres.

The method of the invention consists in processing one piece of content to link it to relevant topics, related to domains and semantic links. This is called in what follows 'content expansion'. The method of the invention consists in fetching information related to the content to be expanded and using algorithms to extract topics, to classify them, and to compute their semantic links. The process is performed in advance at back-end (i.e. before putting the VOD content asset on-line or before the scheduled time of broadcast events): The topics, semantic links and domains are stored into a knowledge base. The original metadata provided with the content can be used as a seed. They are analyzed with said algorithms.

In a preferred embodiment, the semantic links are kept very simple. This acts as meta-types. For instance, a fetched piece of data can be 'about the movie' and will be stored as a topic with such simple semantic link. This allows gathering data of very different natures and let each movie be related to many kind of data belonging to any domain of the human knowledge.

Some fields of the provided data are transformed in an obvious way into a semantic link: For instance, the name of an actor is a topic coming from the value of an 'actor' field; the field name itself becomes the 'contributing as an actor' semantic link relating the topic (the actor name) to the content. The domain is also easily computed; in the example, the domain is 'Production', i.e. just a typical multi-media domain. This kind of mapping is called in what follows 'simple field derivation'.

Some of the fetched data are of textual nature (e.g. content descriptions) and require a Natural Language Process (NLP) to extract the topics and their semantic links. This kind of mapping is called in what follows 'textual derivation'. The algorithms are in charge of detecting elements of the text that have a clear interpretation and have a relevant meaning for the expanded content. The context of the analyzed text and the text around the extracted topic are used to derive the semantic link.

Figure 2:
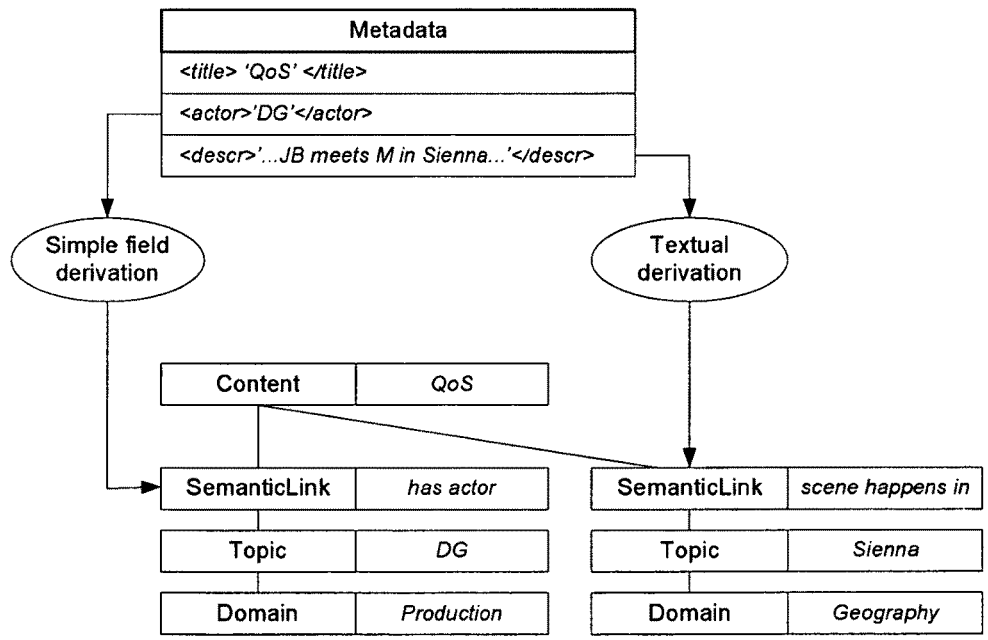

In an embodiment as illustrated in the FIG. 2, redundancy between several texts may be used to detect textual elements that are important to the expanded content. In another embodiment, the analyzed text is an extract of a hypertext document. The text elements that constitute hyperlinks of the text are considered as topics. The example of the FIG. 2, it is executed an extraction of topics and semantic links from field and text analysis. The known <actor> tag provides a topic (the actor name 'DG') whose relationship with the movie (the semantic link 'has actor') and its domain (Production) are known in advance, from the definition of the field. The NLP of the textual description field is supposed to be capable of extracting a topic (Sienna) belonging to a new domain (Geography); it is also capable of extracting the semantic link; a trivial link is 'something happens in'; or it could just be an extract of the text where the topic was found (i.e. 'JB meets M in Sienna').

The computation of a topic domain depends on the semantic link. For instance, if the 'middle-age' topic comes from artworks, the topic will be classified as 'cultural' and 'artistic', whereas if it comes from the plot story time, it will be classified as 'historical'. In an embodiment, the topic may belong to different domains and the semantic link can just consists in recording through which domain the topic is related to the given piece of content.

Since most often the original metadata are not rich enough for the purpose of the invention, they are completed by using other sources, which can be favorite data providers, the open Web, or the Semantic Web. This completion mechanism is a data enrichment process called, in what follows, 'by-content expansion', since its starting point is the content and its original content metadata. Typically, it consists in fetching data related to the content as identified by its title, and data related to metadata like actors or predefined themes. Some of the fetched data may be simply processed through simple field derivation and other data require textual derivation, depending on the nature of the data source.

Figure 3:
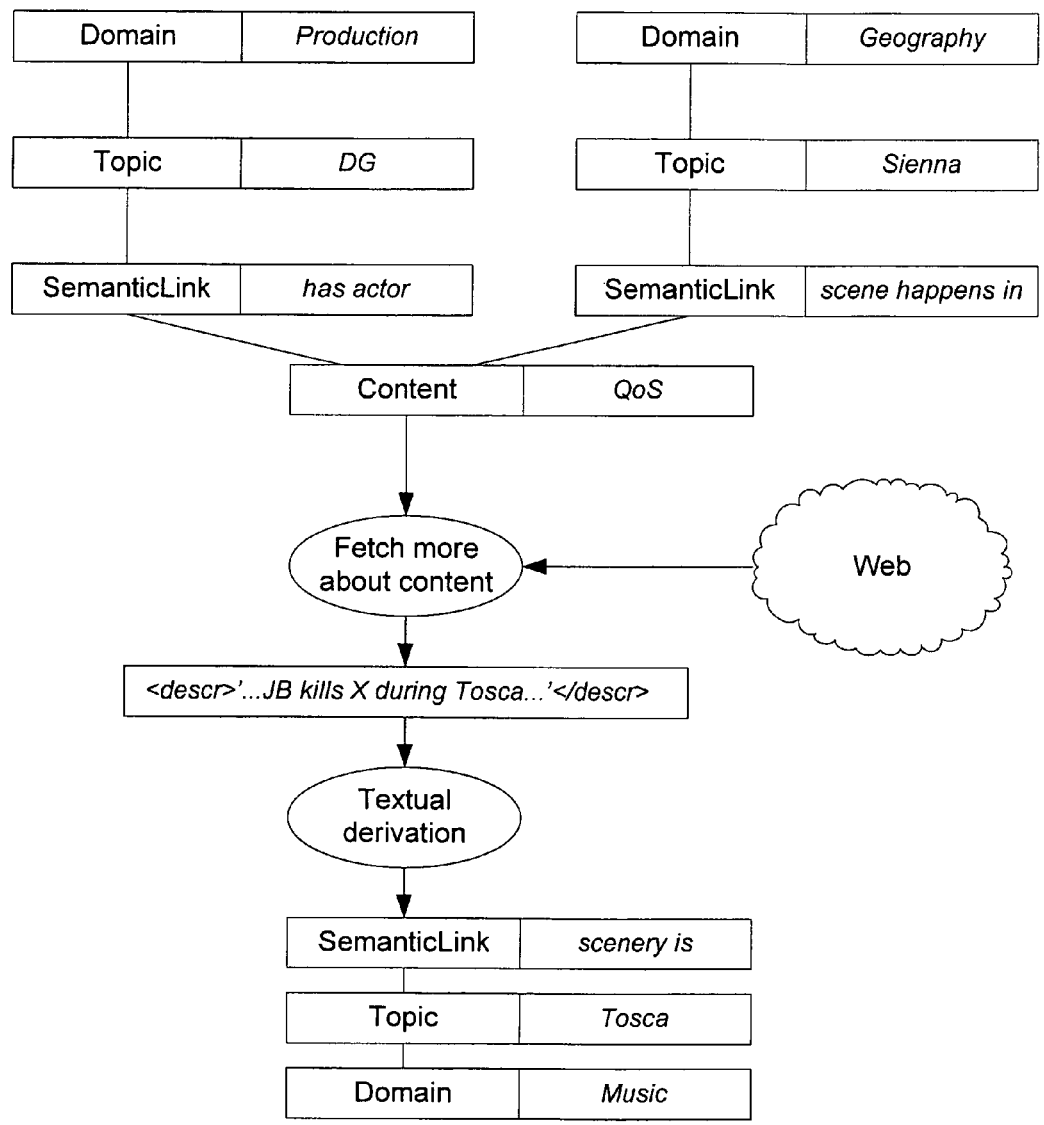

The method of the invention then executes a second data enrichment process, which is called, in what follows, 'by-topic expansion' as illustrated in the FIG. 3. The by-content expansion process looks for information about the content that was not available in the original provided data. It looks for data for instance on the open internet using well identified sites describing audio/visual content. When information is found, the previous simple field or textual derivation can be applied on it, in order to derive a topic with its semantic link and domain, unless the data structure of the fetched data source is known and provides simple fields. After having processed all pieces of contents of a catalog using by-content expansion, the method consists in processing each topic by trying to get additional information on it. The topic is handled exactly as in the by-content expansion process: Information about the topic is fetched from different sources and simple field or textual derivation is used. The result of this process is to link topics to other topics. This process can be repeated as many times as necessary. The final number of topics in the knowledge base depends on the number of iterations. For instance, consider a topic such as the opera 'Tosca'; it is found during the by-content expansion as related to the James Bond movie 'Quantum of Solace', with the domains 'Music' or 'Opera', or both, and the semantic link 'seen during Quantum meeting', or 'performance attended by Dominic Greene'; then the by-topic expansion may find it is an opera by Puccini, and Puccini becomes a new topic related to 'Tosca'.

Figure 4:
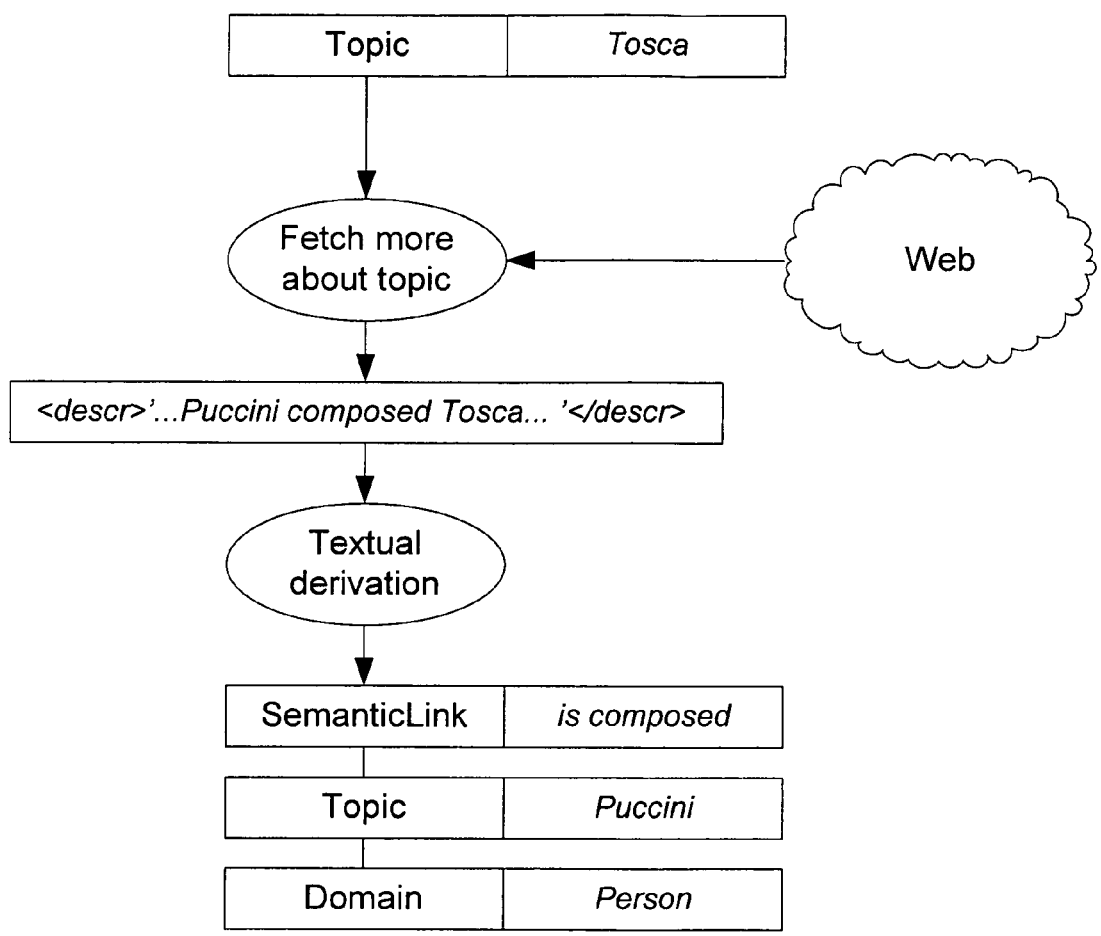

The method of the invention takes care to identify topics. The by-topic expansion process is illustrated in the FIG. 4. The by-topic expansion process looks for information about previous topics. It looks for data for instance on the open internet using well identified sites describing topics of the given domain. When information is found, the previous simple field or textual derivation can be applied on it, in order to extract a new topic, unless the data structure of the fetched data source is known and provides simple fields. The new extracted topic is related to the previous one. This can be done through a semantic link just as for content-topic relationships but it is not necessary. All the expansion algorithms when finding a topic related to one piece of content must be able to detect if this topic is already known. If a found topic is already in the knowledge base, this means the topic is already related to another piece of content since all topics come from content expansion: The topic is shared between the two contents, with possibly different semantic links. Thus, the topic constitutes an association of the two pieces of contents.

On the basis of the data structure built by the described method, a system can be implemented to provide a navigation experience close to the mentioned human cognitive activity consisting in association building. An interface allows the consumer accessing the finite list of knowledge domains. From a selected domain of interest, the consumer may follow links to topics that correspond to its current 'association mood' (the mood of the moment that drives the kind of cognitive association built by the user at that moment), and then to other related topics in the same way, or to some related contents, and from the newly found piece of content then to other topics, and so on. Serendipity is enabled by the richness of the topics and their classification according to human knowledge domains rather than being limited to the specific content domain.

The system can be exploited by starting also from a given piece of content, for instance a watched content or information in an EPG. In that case, the list of knowledge domains and the related topics will be limited to the one relevant to the selected content. The resulting navigation paradigm can be described as rendering the essence of a 'lazy navigation' on the internet, where the user travel through the links without paying much attention to the text and details, just following its envies. This makes content information browsing a close experience from TV channel zapping.

Thus, the proposed system so far solves the usage issue by solving the data model issue. In turn, it raises limitation issues, which are just the same as the previously mentioned ones: Exclusiveness (remaining catalog oriented), gathering (delineating the metadata source and the depth of the data fetching), and storage (limiting the amount of fetched data). The method of the invention is extended to solve these issues.

The solution just capitalizes on the previous method specificities. Indeed, the gathering and storage issue are now concentrated in the by-topic expansion process: with the proposed method, solving the storage issue became equivalent to constrain the by-topic expansion. It is solved by using an algorithm that decides how many times the by-topic process is iterated, and what are the criteria to fetch data and record them as new topics in the knowledge base.

In a preferred embodiment, the iteration process is applied a pre-determined number of times and topics are recorded if, and only if, they are related to some degree to some other piece of content. Another criterion can be to fetch the topic only if belonging to a number of preferred domains (e.g. 'Science' or 'Politic' domains could be considered less attractive than 'People' or 'Sport'). To come back to our Quantum of Solace example, the 'Puccini' topic could just be fetched only if there is a content in the database that can be related to it, for instance if there is a documentary on the time period in Italy when Puccini was living. Thanks to these algorithms, the iteration of the by-topic expansion stops when no new topic is found to be recorded in the knowledge base.

According to one embodiment, the topic and semantic link are stored in a triple-store database. A triplestore is a purpose-built database for the storage and retrieval of Resource Description Framework (RDF) metadata. Much like a relational database, one stores information in a triplestore and retrieves it via a query language. Unlike a relational database, a triplestore is optimized for the storage and retrieval of many short statements called triples, in the form of subject-predicate-object, like "Mary is 35" or "Mary knows Judy".

Figure 5:
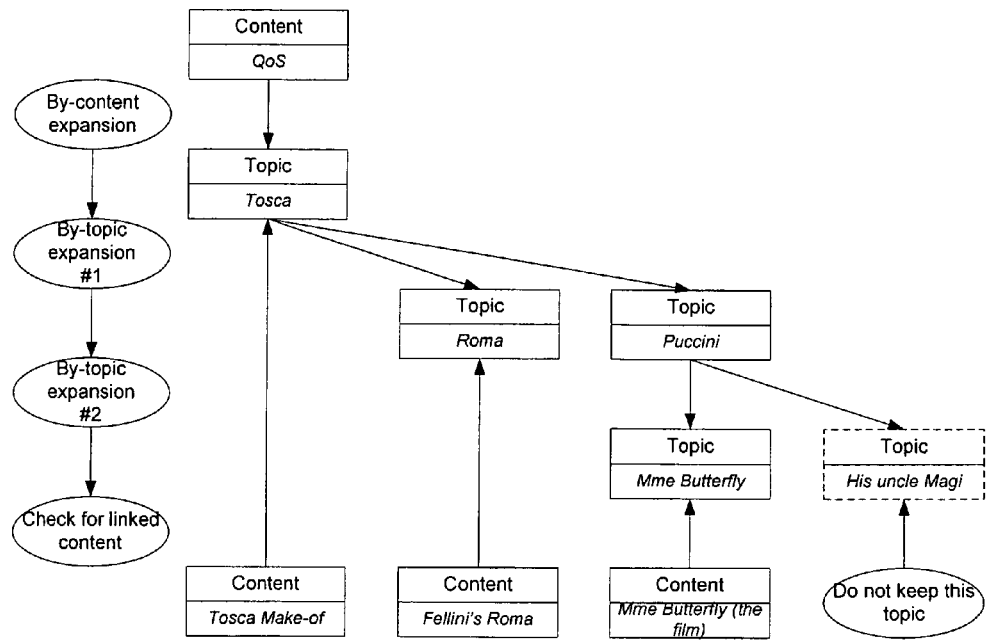

Using the same kind of algorithm and constraints, the method also consists in recording in the knowledge base a reference to the found data rather than the data themselves. The data that are kept outside the knowledge base are then no more taken into account by the next iteration of the by-topic expansion. The iteration of by-topic expansion is shown at the FIG. 5. The by-topic expansion process is iterated. It can be stopped after a predefined number of times and only new topics pertaining to available contents can be stored. This focus the process on the operator's catalog and limit the size of the knowledge base. The process results in the building of content-topics-content chains.

However, the system may still allow the consumer interface to fetch these data using the reference if required by the consumer or by the system settings to handle queries coming from any navigation, search or recommendation application. The decision to fetch the data is then taken in real-time, when requested by the consumer client, rather than during the preparation stage.

This lets us just with the Exclusiveness limitation issue. The method also solves this by starting the whole process from the operator data. Then, it tightly controls that all topics fetched during the process are referring to contents that are available inside the operator catalog. The previously proposed algorithm solving storage and gathering limitations ensures this by integrating the exclusiveness constraint.

In a preferred embodiment, Semantic Web data and related technologies can be wisely capitalized on. The cloud of linked data of the Semantic Web provides the additional topics to be linked to the content, and the structure of such data greatly helps to derive the topic domain and the semantic link: The domain is explicitly defined by the data source or by related data sources, and the semantic link is typically the property in the triple relating the piece of content to the topic. All found triples, which provide more information on the topic itself, can be used to understand what the topic and the property mean. Among those triples, some associate the topic to other topics, and can be used as the basis of the by-topic expansion. In this embodiment, NLP use engines that map elements of the analyzed text to data of the Semantic Web. Such text elements provide topics. The system then uses Semantic Web technologies to store and manage gathered topics, the semantic links, and the knowledge domains. A vocabulary and related rules makes an ontology. The triples naturally store the topics classes and properties render the semantic link concept. Other relationships may be derived using the ontology. Eventually, the references to external data are simply the data URI issued by the Semantic Web.

Figure 6:
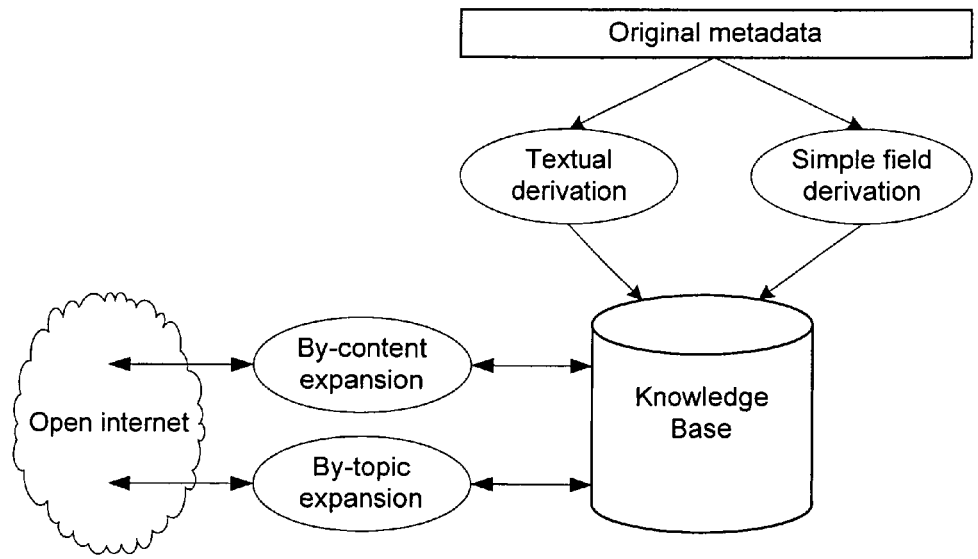

To sum up, the proposed method solves the limitation issues as follow, as illustrated in the FIG. 6:

Relaxing model limitation: By using the open and generic topic concepts and wide human knowledge domains, the present invention avoids restricting access to information due to rigid data modeling. The system is able to keep a reference to any topic that is related to a piece of content, while recording the meaning of that relationship through the semantic link concept.

Relaxing usage limitation: The invention allows the implementation of a system based on a consumer-driven navigation among unbounded topics in well identifiable human knowledge domains and understandable semantic links.

Relaxing gathering limitation: By using the controlling the by-topic iteration, the system makes possible to exploit very open data sources, like the open Web or the Semantic Web and its cloud of linked data and becomes independent from a unique $3^{rd}$ party data provider. By relating data through generic properties, the system may go through various data stores.

Relaxing storage limitation: The system identifies data that are related to the content but keeps reference to the data source rather than fetching the whole data tree. When content metadata queries are handled, the system assesses if the referenced data would be useful to answer the query and fetch it in real time if needed.

Figure 7:
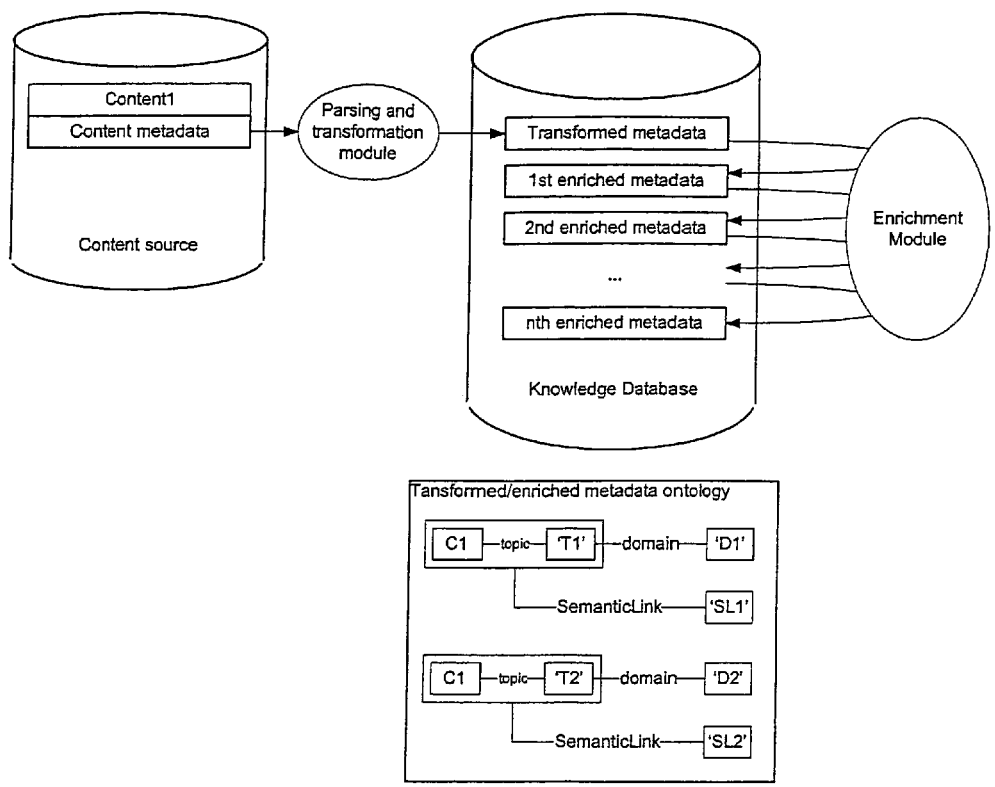

The FIG. 7 shows the method and apparatus (modules) of the claim. A module is in charge of importing content metadata in the Knowledge base and transforming them according to the local ontology, including topic and semantic-link triples. A second module is in charge of enriching these transformed metadata n times.

Figure 8:
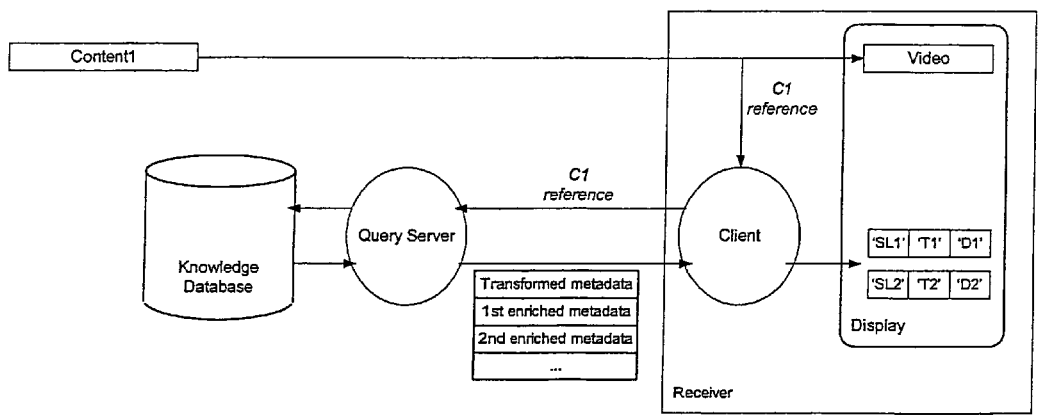

The FIG. 8 shows the client apparatus. The functionality that the previous system of modules made possible is realized through two additional modules: the Client on the receiver side and Query Server on the other side. The Client module is capable of extracting the content reference and requesting the enriched metadata to the query server; it is then able to interpret the query answer by knowing the ontology used by the Knowledge base and structuring the server replies. It uses the domain and semantic links to organize the display of the information on the rendering device.

Figure 9:
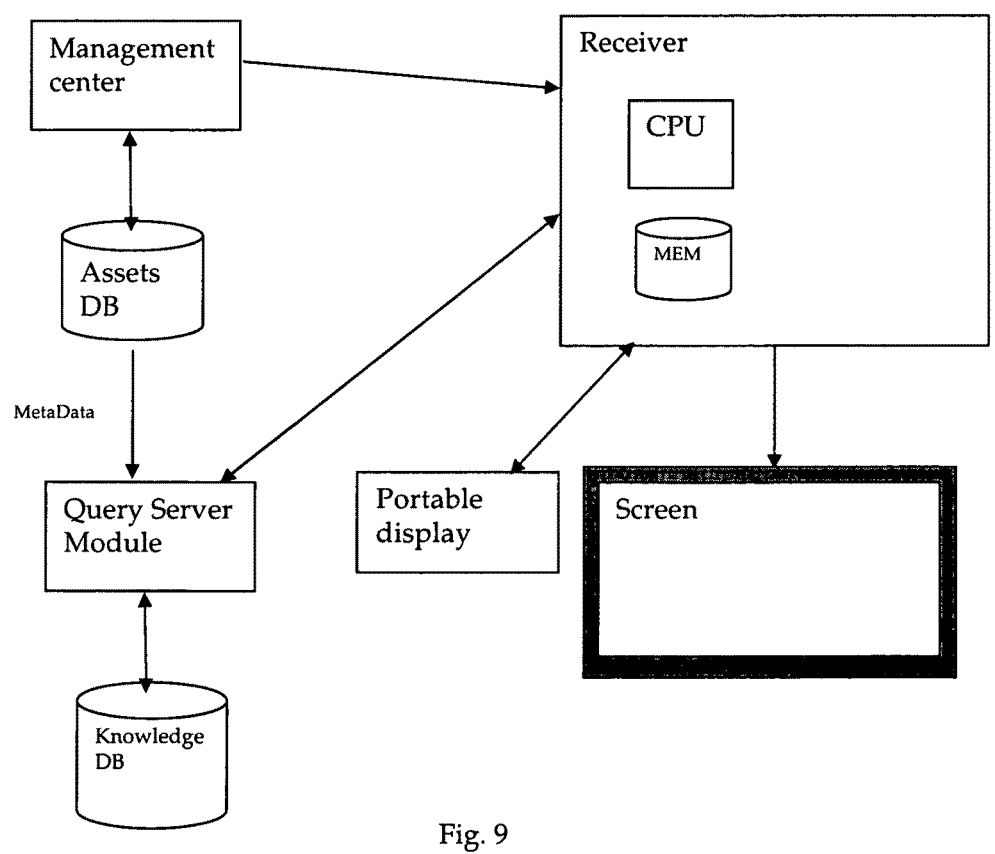

The FIG. 9 shows an example of the embodiment of the system. The management center is in charge of broadcasting the audio/video assets to the receivers, assets that are stored in the assets database.

The main embodiment of the invention is the broadcasting mode, i.e. the management center sends the assets to a plurality of receivers in a one-way mode. An asset as previously described, contains metadata i.e. data that describe the content currently broadcasted. These metadata can be sent without the assets, generally in advance to form the EPG (Electronic Program Guide).

The receiver receives the asset as well as the metadata. These data are processed by a CPU so as to extract the audio/video data and the metadata. The memory of the receiver is used to store the metadata for further processing in case that the user is willing to obtain more information about the asset. The asset is intended to be displayed on a screen and the metadata can be exploited be a client module, in the figure, illustrated by a portable display such as a tablet of a smartphone. The user can then send a request for additional information to the Query Server Module (QSM) to obtain further information. The QSM, thanks to its knowledge database will therefore send the requested information that was populated previously concerning the asset that the user has specified. For that purpose, the QSM comprises processing means, and communication means to the various external database used to populate its knowledge database. The QSM has also access to the asset database (in particular to the metadata of said assets) in order to prepare the enhanced data ready to a user's request.

The invention of claimed is:

1. A method to enhance transmitted contents, the method comprising the steps of:
    selecting contents to be transmitted and obtaining metadata related to these contents,
    processing the metadata so as to produce enhanced metadata, said enhanced metadata being used to describe the contents, said enhanced metadata being obtained by the steps of:
        selecting a content to be processed, and, for said content, parsing the metadata of said content to populate a knowledge database so as to obtain transformed metadata in the form of data triples, each triple being formed by a subject, a predicate and an object, a first set of data triples being defined by a first value of the predicate,
    extracting from the metadata, data to populate a first level of the first set of data triples, the subject of said data triples being a reference to the content,
    iterating a data enrichment process n times, said data enrichment process creating at each iteration a new level of first set of data triples, by fetching from the open Internet additional data to be set as objects of elements of first set of data triples, each subject of said elements being an object of elements of the first set of data triples obtained at the previous level of iteration,
    if during the iteration, the fetched additional data is detected to be related to another content, representing this relationship as a new element of the first set of data triple in which the subject is said fetched additional data and the object is a reference to said detected related content,
    the number n of iterations is determined by two integer parameters N and K, N>0 and K≧N used as follows:
    iterating the enrichment process from 1 to K, and in the case that one of the fetched additional data is detected to be related to another content, storing into the knowledge database all first set of data triples previously created up to the level in which this positive detection is found,
    and in the case that none of the fetched additional data is related to another content, storing into the knowledge database the first set of data triples corresponding to the iteration 1 to N,
    sending at least one of the contents on a specific channel with the reference to the content corresponding to the one stored in the knowledge database;
    receiving the content by a receiver implementing a specific client module,
    receiving by a query server module connected to the knowledge database a request from said client module identifying said at least one specific content with the said reference;
    sending by the query server module all or part of the enhanced metadata related to the identification of the specified content;

controlling by the client module a graphical user interface in charge of displaying the result sent by the server in order to translate the received data triples into graphical elements.

2. The method of claim 1, wherein the data triples are stored using table and columns of a relational database.

3. The method of claim 1, the data triples are stored using a triple-store implementation.

4. The method of claim 1, wherein the fetched additional data are defined by an address, and for all or part or of the fetched additional data, the storage step into the knowledge database stores the addresses of the fetched additional data rather than the fetched additional data themselves.

5. The method of claim 4, wherein the addresses of the fetched additional data is stored into the knowledge database when the fetched additional data are not related to another content.

6. The method of claim 4, wherein it comprises the step of determining by the query server module if the enhanced metadata to be sent to the client module contain addresses of additional data located on the Open Internet, in the positive event, fetching by the query server module the data from the Open Internet to complete the enhanced metadata.

7. The method of claim 4, wherein it comprises the step of determining by the query server module if the enhanced metadata to be sent to the client module contain addresses of additional data located on the Open Internet, in the positive event, removing the addresses from the enhanced metadata.

8. The method of claim 4, wherein, upon reception of enhanced metadata containing addresses, it comprises the step of fetching by the client module the data from the Open Internet to complete the received enhanced metadata.

9. The method of claim 4, wherein, upon reception of enhanced metadata containing addresses, it comprises the step of discarding the addresses from the displayed result.

10. The method of claim 4, wherein the client module is linked to a client profile, said client profile containing parameters allowing to decide if the data fetched from the Open Internet are to by stored into the knowledge base as complete data or as address only.

11. The method of claim 1, wherein the knowledge database comprises a second set of data triples, and for a given element of the second set of data triples, the subject of said element is an element of the first set of data triples, and the object of said element of the second set of data triples comprises a qualifier to qualify the element of the first set of data triples.

12. The method of claim 4, wherein the request of the client module comprises user preferences, said user preferences containing at least a user's qualifier used to filter the first set of data triples, by keeping only the elements of the first set of data triples for which the related element of the second set of data triples matches said user's qualifier.

13. The method of claim 1, wherein the request of the client comprises user preferences, said user preferences containing parameters allowing, by the query server, to tune a length of the data returned.

* * * * *